J. ZIHLMANN.
GLASS MOLD TRIMMERS.
No. 181,888. Patented Sept. 5, 1876.
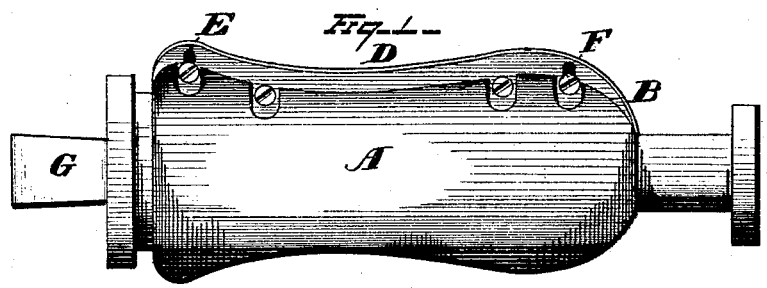
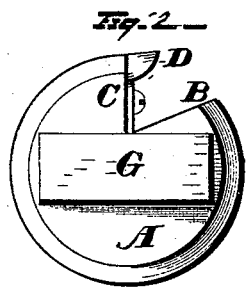

UNITED STATES PATENT OFFICE.

JOSEPH ZIHLMANN, OF BELLAIRE, OHIO.

IMPROVEMENT IN GLASS-MOLD TRIMMERS.

Specification forming part of Letters Patent No. 181,888, dated September 5, 1876; application filed July 13, 1876.

*To all whom it may concern:*

Be it known that I, JOSEPH ZIHLMANN, of Bellaire, in the county of Belmont and State of Ohio, have invented certain new and useful Improvements in Trimmers for Glass-Molds; and I do hereby declare the following to be a full, clear, and exact description of the invention, such as will enable others skilled in the art to which it pertains to make and use it, reference being had to the accompanying drawings, which form part of this specification.

My invention relates to an improved trimmer for glass-molds.

Figure 1 is a side elevation of my invention; and Fig. is an end view of the same.

The object of my invention is to provide a device for trimming wooden molds of the construction patented to me August 18, 1874. Wooden molds, after being subjected to use, burn away, so that the objects produced are defective in shape. Again, the molds are turned or rotated when the molten glass is held therein, and any hard or projecting portion contained in the glass operates to cut a groove in the mold. When the succeeding article is run in the mold, the molten glass will fill the groove thus made, and thus form a defective article. These molds have constantly required an experienced workman to keep them in repair and render them smooth.

My invention consists in a trimmer provided with a removable knife or cutter, the cutting-edge of which conforms in shape and length to the contour of the finished article desired to be run in the mold.

In the drawings, A represents the body of the trimmer, formed with a groove, B. To the wall C of groove B the cutter D is secured by screws, clamps, or any equivalent device.

In order to adjust the cutter to and from the center of the body of the trimmer, the knife or cutter D is provided with oblong slots E, through which the screws F are secured.

The end of the trimmer G is made of square or rectangular shape for the attachment of a wrench, or other like device, or turn the trimmer in the mold.

The operation of the device is as follows: When the mold becomes worn the metal plates are removed, and the trimmer inserted in the mold. The mold is then placed in a vise or other like device, and firmly held while the mold is rotated therein. The cutter serves to remove the roughened or uneven surfaces from the interior of the mold, and quickly renders it capable of further use. This operation can be carried on by unskilled labor, and it renders all articles produced in the molds of uniform size and shape.

Having fully described my invention, what I claim, and desire to secure by Letters Patent, is—

1. A trimmer for glass-molds, consisting of the knife or cutter D, in combination with the body A, substantially as and for the purpose set forth.

2. The combination, with body A, of the knife D, provided with slots E, substantially as and for the purpose set forth.

In testimony that I claim the foregoing I have hereunto set my hand this 12th day of July, 1876.

JOSEPH ZIHLMANN.

Witnesses:
W. H. THURBER,
BENJ. POWER.